Oct. 19, 1965  R. J. LEMETTRE  3,212,137
MACHINE FOR THE CONTINUOUS PRODUCTION OF SHEETS
OF THERMOPLASTIC MATERIAL
Filed Feb. 2, 1962

Inventor:
Raymond Jean
    LEMETTRE
by: J. Delattre-Seguy
     Attorney

United States Patent Office 3,212,137
Patented Oct. 19, 1965

3,212,137
MACHINE FOR THE CONTINUOUS PRODUCTION
OF SHEETS OF THERMOPLASTIC MATERIAL
Raymond Jean Lemettre, Pont-A-Mousson, France, assignor to Compagnie de Pont-A-Mousson, Nancy (Meurthe-et-Moselle) France, a French body corporate
Filed Feb. 2, 1962, Ser. No. 170,560
Claims priority, application France, Feb. 7, 1961, 851,985
5 Claims. (Cl. 18—15)

The present invention relates to the production of sheets of plastic material from a material in the powdered state and more particularly to the continuous production of plane sheets.

The invention is applicable to thermoplastic materials which become heated under the effect of a high-frequency electric field, for example rigid polyvinyl chloride and like materials such as copolymers of polyvinyl chloride.

The object of the invention is to provide a machine to be used in a process of producing plane sheets comprising continuously supplying and compressing a layer of said thermoplastic material in the powdered state between two moving faces driven in the same direction and at the same speed, and simultaneously producing an electric field alternating at high frequency across the two moving faces and the layer of thermoplastic material until jellification of the latter so as to produce a continuous plane sheet.

This machine comprises in combination: two movable metal faces separated by a space, a supply device for supplying the space with a layer of powdered plastic material, means for applying at least one of the faces on the layer at a certain pressure, a driving device for driving at least one of the movable faces, the other face being driven for example through the medium of the layer of plastic material, and generating means for generating the high-frequency electric field connected to each of the movable metal faces which constitute two electrodes one of which is positive and the other negative.

In one embodiment of the invention, one of the metal faces is constituted by an endless metal belt held under mechanical tension and the other by a metal cylinder partially encompassed by the belt and mounted to rotate about a fixed axis.

Further features and advantages of the invention will be apparent from the ensuing description with reference to the accompanying drawings to which the invention is in no way limited.

Figure 1:
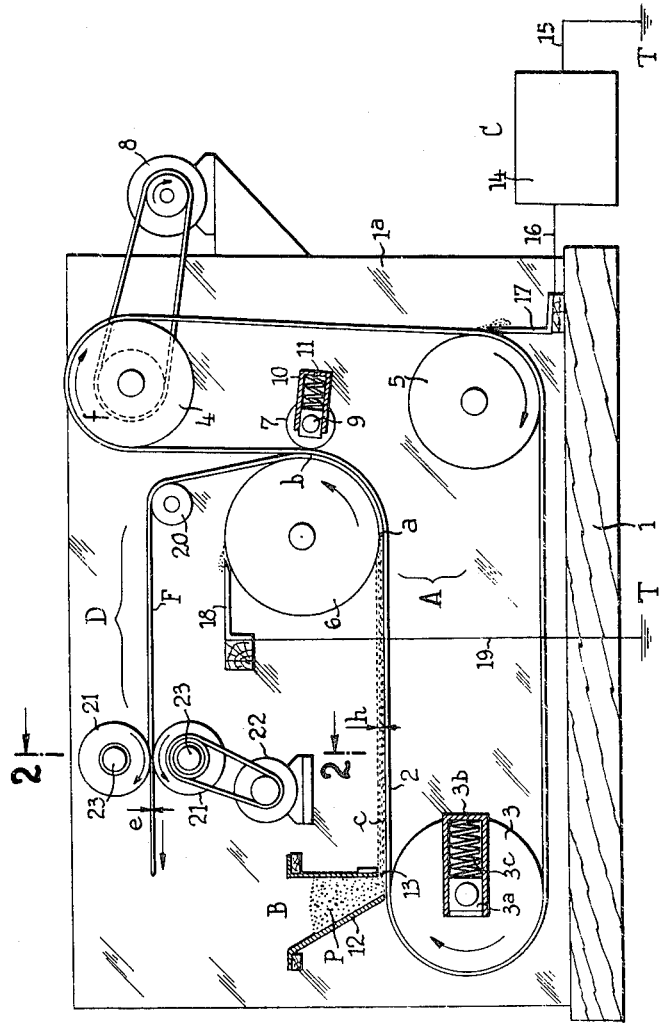
FIG. 1 is a diagrammatic sectional view of the machine.

In the illustrated embodiment, the machine comprises, mounted on a stand: a conveyor A; a supply device B for supplying thermoplastic material in the powdered state to the conveyor A; generating means C for generating an electric field alternating at high frequency; and a receiving device D for receiving the obtained sheet F of thermoplastic material.

The stand comprises, for example, a support 1 and one, or preferably two, parallel side members 1a of insulating material such as wood.

The conveyor A mounted on the insulating stand comprises an endless belt 2 of sheet steel which has a thickness of, for example, about 5/10 mm., and passes round inner rollers 3, 4 and 5, and an outer roller 6, a pressure-applying roller 7 being located inside the belt 2. Between the roller 6 and the rollers 3 and 4, the endless belt 2 comprises a horizontal portion, after which it changes direction at ab between the roller 6 and the roller 7 so as to form a substantially vertical portion and then passes round the roller 4.

The roller 3, for example, has each of its end journals carried by a bearing 3a which is slidable in a housing 3b forming a slideway in opposition to the action of a spring 3c.

The driving roller 4 is driven in rotation in the direction of arrow f by a motor-speed reducer unit 8.

Each end journal of the pressure-applying roller 7 is carried by a bearing 9 slidable in a housing 10 constituting a slideway in opposition to the action of a compression spring 11.

The supply device B consists of a hopper 12 fixed to the stand 1 above the horizontal portion of the endless belt 2. It has at its lower part an opening 13 which has a height $h$ above the belt 2 which is adjustable, for example by means of a register, in the known manner. The hopper 12 is filled with thermoplastic material in the powdered state, for example polyvinyl chloride devoid of charges.

The device C consists of a generator 14 of an electric field alternating at high-frequency connected to earth T by a conductor 15. The high-frequency current is transmitted to the endless belt 2 by a conductor 16 connected to a brush, or a series of brushes, 17 which rub against the endless belt 2 for example in a direction tangent to the roller 5.

The device C is completed by a brush 18, similar to the brush 17, which rubs in a horizontal direction against the metal roller 6 to which it is substantially tangent. The brush 18 is connected to earth T by a conductor 19. In the device C, the endless belt 2 and the roller 6 therefore perform the function of electrodes which are positive and negative respectively.

Figure 2:
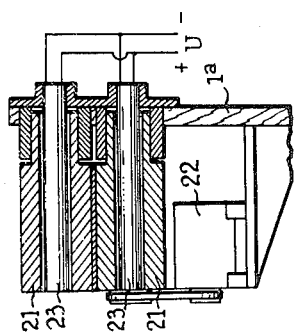
FIG. 2 is a partial vertical sectional view taken along line 2—2 of FIG. 1.

The receiving device D for receiving the plastic sheet comprises a roller 20 which produces a change in the direction of movement of the plastic material sheet F and a pair of rollers 21 which pull on and calender the sheet. One of these rollers is driven in rotation by a motor-speed reducer unit 22. The two rollers 21 are of steel and are capable of being heated, for example, by inner sleeves 23 having electric resistances fed by a source of current U (FIG. 2).

The machine operates in the following manner:

In order to bring the machine rapidly into operation when cold, the endless belt 2 and the roller 6 are previously heated, for example by means of gas burners (not shown) until they reach a minimum temperature of 140° C. which the device C alone must subsequently maintain.

Thereafter, the conveyor A being put in motion, the thermoplastic powder P contained in the hopper 12 is deposited by the effect of gravity on the taut horizontal portion of the belt 2 in the form of a layer $c$ having the thickness $h$ corresponding to the height of the opening 13 above the belt. This layer is driven toward the roller 6 against which it is compressed in the arc of contact $ab$ by the belt 2, owing to the tension of the upper portion of the belt between the rollers 3 and 4 and by the pressure-applying roller 7. The roller 6 is itself driven by friction at the same speed as the belt 2.

The high-frequency electric current produced by the generator 14 passes through the brush 17 and the endless belt 2, through the layer of compressed plastic material between the steel band 2 and the roller 6, and thereafter through the brush 18 and the conductor 19.

The portions of the endless belt 2 and the roller 6 pertaining to the arc of contact $ab$ with the layer $c$ of thermoplastic material constitute the armatures of a capacitor in which said layer performs the function of a dielectric insulating element. Therefore, the layer of powdered thermoplastic material compressed between the roller 6 and the belt 2 by the combined effects of the tension of the belt and the pressure exerted by the roller 7 is intensely heated in the region pertaining to the arc $ab$ by dielectric losses which produces, as is known, the jellification. The length of the arc $ab$ of the passage of the layer $c$ between the belt 2 and the roller 6 is calculated in accordance with the speed of the belt so as to permit a sufficient supply of heat to obtain the jellification of the thermoplastic material.

The layer of thermoplastic powder $c$ driven in contact with the roller 6 at a thickness $h$ issues therefrom in the form of a sheet of plastic material F which is still hot and soft. This sheet F is first taken hold of by its end, for example by means of tongs, placed on the roller 20, and pulled toward the rollers 21 until it is seized by the latter and is continuously driven thereby. Between the rollers 21 heated to a temperature of about 180° C., the soft sheet F is calendered and thinned down, in accordance with the space between the rollers 21, to the desired thickness $e$. Beyond the rollers 21 the sheet F can be cooled and hardened in the plane state or after forming.

It should be noted that beyond the point $b$ of the arc $ab$ and after having loss contact with the sheet of plastic material F formed, the belt 2 is usually covered with a thin film of non-jellified thermoplastic material powder. This powder is scraped by the brush 17 which thus cleans the surface of the belt 2. The roller 6 is scraped in the same manner by the brush 18. Thus there is no danger of the plastic material becoming stuck to these surfaces 2 and 6 finally burning which would hinder the formation of the sheet F. Therefore, owing to the brushes 17 and 18 constituting scrapers the surfaces of the belt 2 and the roller 6 in contact with the plastic material in the region of the arc $ab$ remain perfectly clean.

By way of example, good results have been obtained under the following conditions:

Plastic material: polyvinyl chloride powder.
Grain size: 50 microns approx.
Compression of the plastic material between the endless belt 2 and the roller 6 in the region of the arc $ab$: 500 g./sq. cm.
Power of the device C: 3 kw.
Frequency of the electric field: 15 megacycles.
Linear speed of the belt 2: 20 cm. per minute.
Length of the arc $ab$: 30 cm.

By means of the invention it is possible to obtain sheets of polyvinyl chloride having a high tensile strength between 6 and 7.5 kg./sq. mm., which is distinctly superior to that of plates or sheets obtained by conventional methods of calendering and extrusion which is about 5.5 to 6 kg./sq. mm.

Thus it is normal to obtain sheets having a tensile strength of about 7 kg./sq. mm.

Although specific embodiments of the invention have be made therein without departing from the scope of the invention as defined in the appended claims.

Thus, instead of being entirely of steel, the rollers 3, 4, 5 and 6 could be of wood which is covered with a layer of asbestos about a few millimetres thick acting as a heat insulator and has an outer steel sheet 5/10 millimetre thick.

This arrangement permits a rapid heating of the endless belt 2 and rollers 3, 4, 5 and 6 by a mere contact with the thermoplastic material heated by the generator 14 and thus permits dispensing with the prior heating by the aforementioned means when starting up the machine.

Having now described my invention what I claim as new and desire to secure by Letters Patent is:

1. Machine for continuously producing a sheet of plastic material from a powder thermoplastic material which becomes heated when traversed by a high-frequency electric field, comprising a stand and, mounted on the stand: two movable elements consisting of an endless metal conveyor belt and a roller having a metal face and mounted on the stand for rotation about a fixed axis, the belt partly encompassing the periphery of the roller, means for holding the belt taut so as to apply it yielding against the part of the periphery of the roller it encompasses, a supply device for depositing said powdered thermoplastic material on the belt, driving means for driving at least one of said movable elements whereby the belt is moved longitudinally and the roller is rotated about said axis and the powdered thermoplastic material is fed and compressed between the belt and roller, generating means generating a high-frequency electric field and comprising one conductor connected to the belt and another conductor connected to the metal face of the roller so that the belt and metal face constitute two electrodes one of which is positive and the other negative, whereby a high-frequency field is created between the belt and metal face and across the powdered thermoplastic material compressed therebetween.

2. Machine as claimed in claim 1, wherein said driving means drive the belt and the roller is freely rotative on said axis and is driven in rotation by the belt through the medium of the thermoplastic material compressed between the belt and roller.

3. Machine is claimed in claim 1, further comprising a receiving device mounted on the stand for receiving the compressed thermoplastic material sheet issuing from between the roller and the belt, the receiving device comprising a pair of rotative rollers, means for heating the pair of rollers, and means for driving in rotation one of the rollers of the receiving device at such speed that it pulls on said sheet, the latter being calendered by the rollers of the receiving device.

4. Machine as claimed in claim 1, comprising electric brushes which connect said conductors to said movable elements, one of the brushes being substantially tangent to the periphery of the roller and extending toward said periphery in a direction opposed to the direction of movement of said periphery and the other brush extending toward the belt in a direction opposed to the direction of movement of the belt, whereby said brushes also act as scrapers for cleaning said material elements.

5. Machine as claimed in claim 1, further comprising a resiliently biased roller in pressure-applying relation to the belt in the part of the latter encompassing the roller having a metal face, the last-mentioned roller being on the opposite side of the belt to the pressure-applying roller.

References Cited by the Examiner

UNITED STATES PATENTS

| | | |
|---|---|---|
| 2,288,269 | 6/42 | Crandell. |
| 2,386,966 | 10/45 | MacMillin. |
| 2,433,067 | 12/47 | Russell. |
| 2,476,282 | 7/49 | Castellan _____ 264—126 |
| 2,697,773 | 12/54 | Gordon _____ 219—10.53 |
| 2,756,459 | 7/56 | Kellner _____ 18—15 |
| 2,956,310 | 10/60 | Roop et al. |
| 2,963,746 | 12/60 | Webb et al. |
| 2,998,501 | 8/61 | Edberg et al. |
| 3,001,232 | 9/61 | Martinak _____ 18—15 |
| 3,093,039 | 6/63 | Rheinfrank _____ 219—10.53 |

J. SPENCER OVERHOLSER, *Primary Examiner.*

MICHAEL V. BRINDISI, WILLIAM J. STEPHENSON, *Examiners.*